United States Patent
Geibel et al.

(10) Patent No.: US 10,173,150 B2
(45) Date of Patent: Jan. 8, 2019

(54) WALL ADAPTOR FOR FILTER UNDERDRAIN

(71) Applicant: Xylem Water Solutions Zelienople LLC, Zelienople, PA (US)

(72) Inventors: John L. Geibel, Butler, PA (US); Howard J. Sweeney, McDonald, PA (US)

(73) Assignee: XYLEM WATER SOLUTIONS ZELIENOPLE LLC, Zelienople, PA (US)

( * ) Notice: Subject to any disclaimer, the term of this patent is extended or adjusted under 35 U.S.C. 154(b) by 368 days.

(21) Appl. No.: 14/926,572

(22) Filed: Oct. 29, 2015

(65) Prior Publication Data

US 2016/0121240 A1    May 5, 2016

Related U.S. Application Data

(60) Provisional application No. 62/075,606, filed on Nov. 5, 2014.

(51) Int. Cl.
  *B01D 24/00* (2006.01)
  *B01D 24/24* (2006.01)
  *B01D 24/46* (2006.01)

(52) U.S. Cl.
  CPC .......... *B01D 24/24* (2013.01); *B01D 24/001* (2013.01); *B01D 24/4631* (2013.01)

(58) Field of Classification Search
  None
  See application file for complete search history.

(56) References Cited

U.S. PATENT DOCUMENTS

| | | |
|---|---|---|
| 2,378,239 A | 6/1945 | Myron et al. |
| 3,956,134 A | 5/1976 | Sturgill |
| 4,133,766 A | 1/1979 | Adie |
| 4,196,079 A | 4/1980 | Ward |
| 5,019,259 A | 5/1991 | Hambley |
| 5,087,362 A | 2/1992 | Brown |
| 5,118,419 A | 6/1992 | Evans et al. |
| 5,160,614 A | 11/1992 | Brown |
| 6,048,132 A | 4/2000 | Kupke et al. |
| 6,129,482 A | 10/2000 | Ditullio |

(Continued)

FOREIGN PATENT DOCUMENTS

WO    2014127226 A2    8/2014

OTHER PUBLICATIONS

"TETRA FlumeFlow Interface Plate Technical Data Sheet", Severn Trent Services, Jan. 2009.

(Continued)

*Primary Examiner* — Krishnan S Menon
(74) *Attorney, Agent, or Firm* — The Webb Law Firm

(57) ABSTRACT

A filtration system having an underdrain block and an underdrain wall adaptor. The underdrain wall adaptor includes a vertical end and horizontal base. The vertical end extends from a top wall to a bottom wall of an underdrain block and mates with an end portion of an underdrain block to secure the underdrain wall adaptor to the underdrain block. The horizontal base extends from the vertical end. The invention also includes a method of installing an underdrain wall adaptor. The underdrain wall adaptor controls air and water passage between the flume and the underdrain.

24 Claims, 14 Drawing Sheets

(56) References Cited

U.S. PATENT DOCUMENTS

| | | | |
|---|---|---|---|
| 6,797,166 | B1 | 9/2004 | Hambley et al. |
| 7,090,771 | B2 | 8/2006 | Dyson et al. |
| 7,410,578 | B2 | 8/2008 | Hambley et al. |
| 7,922,903 | B2 | 4/2011 | Roberts et al. |
| 8,177,970 | B2 | 5/2012 | Bradley et al. |
| 2005/0133434 | A1 | 6/2005 | Hambley et al. |
| 2011/0073549 | A1 | 3/2011 | Geibel et al. |
| 2013/0306542 | A1 | 11/2013 | Roberts et al. |
| 2014/0166567 | A1 | 6/2014 | Sweeney et al. |
| 2014/0166593 | A1 | 6/2014 | Berkebile et al. |
| 2014/0217039 | A1 | 8/2014 | Geibel et al. |
| 2014/0251439 | A1 | 9/2014 | Ball et al. |
| 2015/0376889 | A1* | 12/2015 | Ekholm ................ B01D 24/24 210/163 |

OTHER PUBLICATIONS

"TETRA FlumeFlow System Technical Data Sheet", Severn Trent Services, Jan. 2009.

* cited by examiner

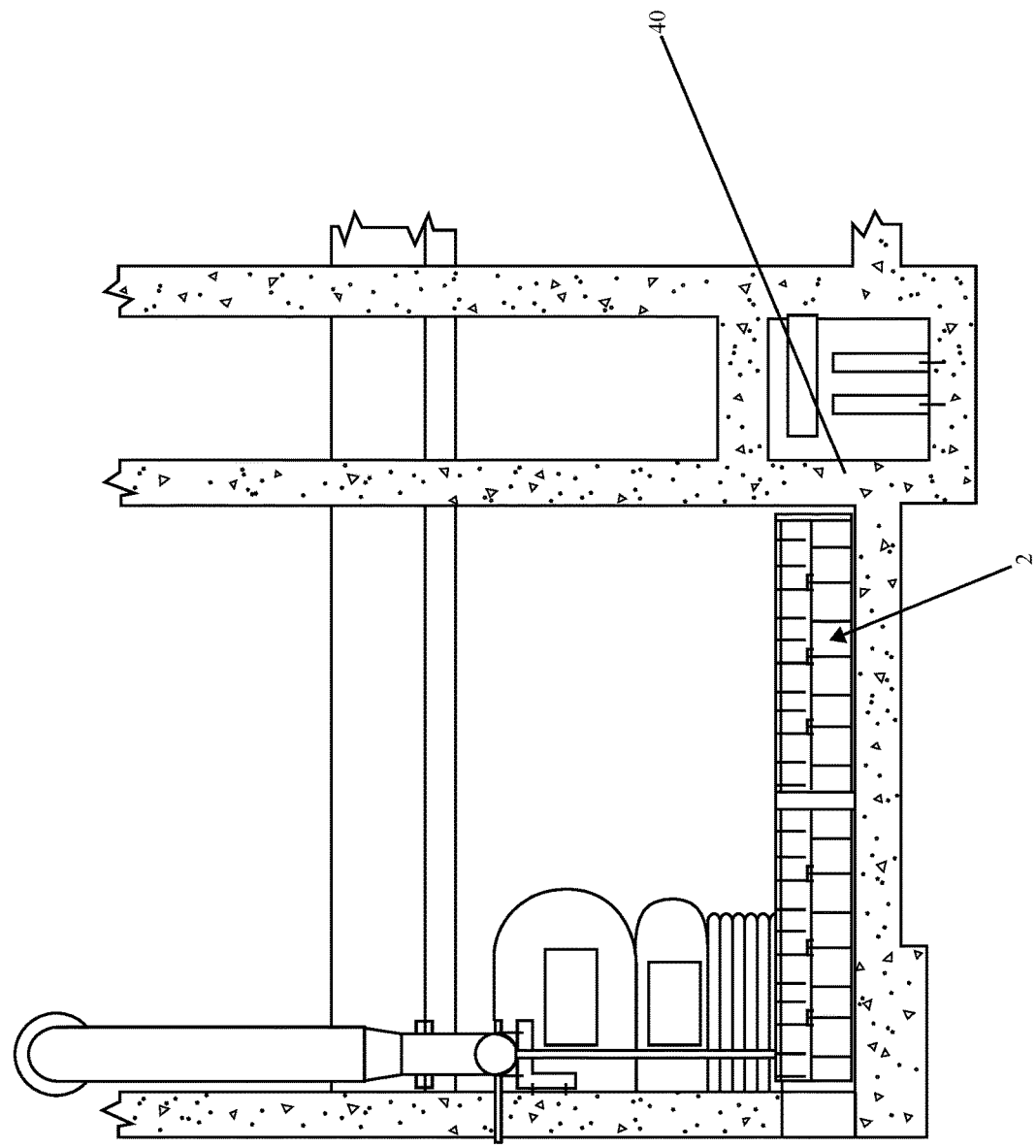

WALL ADAPTOR FOR FILTER UNDERDRAIN

CROSS-REFERENCE TO RELATED APPLICATION

This application claims priority to U.S. provisional patent application No. 62/075,606 filed Nov. 5, 2014, the disclosure of which is hereby incorporated in its entirety by reference.

BACKGROUND OF THE INVENTION

Field of the Invention

The present invention relates to a filtration system, and, in particular, to an underdrain with an underdrain wall adaptor for controlling air and water passage between the flume and the underdrain.

Description of Related Art

Gravity filtration systems use a filter media to remove impurities from water. The main components of gravity filters are filter media and underdrain blocks. Underdrain blocks are generally square or rectangular in cross section and may have a long longitudinal axis as compared to their cross section. They are attached end-to-end to form sections called laterals. The filter media sit atop the underdrain blocks.

In practice, the gravity filtration system works by introducing the solution to be filtered above the filter media. Gravity causes the solution to pass vertically downward through the filter media and into the underdrain block. The underdrain block channels the filtered fluid, which has passed through the filter media, through the underdrain block interior and away from the filter.

Gravity filtration systems must be periodically backwashed with water and/or air. However, it can be difficult to create passages for proper distribution of the air and water between the flume and underdrain, or, in some cases, to prevent air from entering the flume from the underdrain. The flume is the chamber for distribution of backwash water and sometimes air and for collection of filtered water.

The problem of creating passages is usually associated with the geometry or low profile of the underdrain when the water opening is not large enough for a wall feed arrangement while preventing the passage of air from the underdrain into the flume.

Creating a large enough water opening is also difficult when the air-water interface is controlled at a low elevation near the bottom of the underdrain such that air is not restricted when passing through low openings between the flume and the underdrain.

Another problem often encountered is associated with fusion welding of the endplate to the underdrain block. Fusion welding often results in warpage and uneven surfaces, making it difficult to seal the endplate to the filter wall or orifice plate.

Yet another problem often encountered is associated with a dead zone, an area where no backwash water or air can be discharged during the backwashing process for cleaning of the filter media. Particularly, the dead zone can encompass a large area.

SUMMARY OF THE INVENTION

In certain aspects, the present invention includes a filtration system having an underdrain block and an underdrain wall adaptor. The underdrain block can have a top wall, a bottom wall, and two side walls connecting the top wall and bottom wall to define an underdrain block interior. The underdrain wall adaptor can include a vertical end and horizontal base. The vertical end can extend from the top wall to the bottom wall of the underdrain block and can be configured to mate with an end portion of the underdrain block. The horizontal base can extend from a bottom portion of the vertical end.

Also disclosed is an underdrain wall adaptor that can include a vertical end and a horizontal base. The vertical end can extend from a top wall to a bottom wall of an underdrain block and can be configured to mate with an end portion of the underdrain block. The horizontal base can extend from a bottom portion of the vertical end.

Also, in certain aspects, the present invention includes a method of installing an underdrain wall adaptor for a filtration system. The method of installing the underdrain wall adaptor for a filtration system can include: (1) mating an underdrain wall adaptor with an underdrain block; (2) applying a sealant or gaskets on contacting surfaces of the underdrain wall adaptor and/or filter wall; and (3) applying suitable fillet material at a top surface intersection of the vertical end and the filter wall.

BRIEF DESCRIPTION OF THE DRAWINGS

FIG. 14 shows a cross sectional view of a filtration system without an underdrain wall adaptor installed in an underdrain block.

DETAILED DESCRIPTION OF THE INVENTION

It will be apparent to those skilled in the art, that is, to those who have knowledge or experience in this area of technology that many uses and design variations are possible for the filtration system disclosed herein. The following detailed discussion of various alternative and preferred aspects will illustrate the general principles of the invention, and it is also to be understood that the specific devices illustrated in the accompanying figures and described herein are simply exemplary and should not be considered as limiting.

Figure 1:
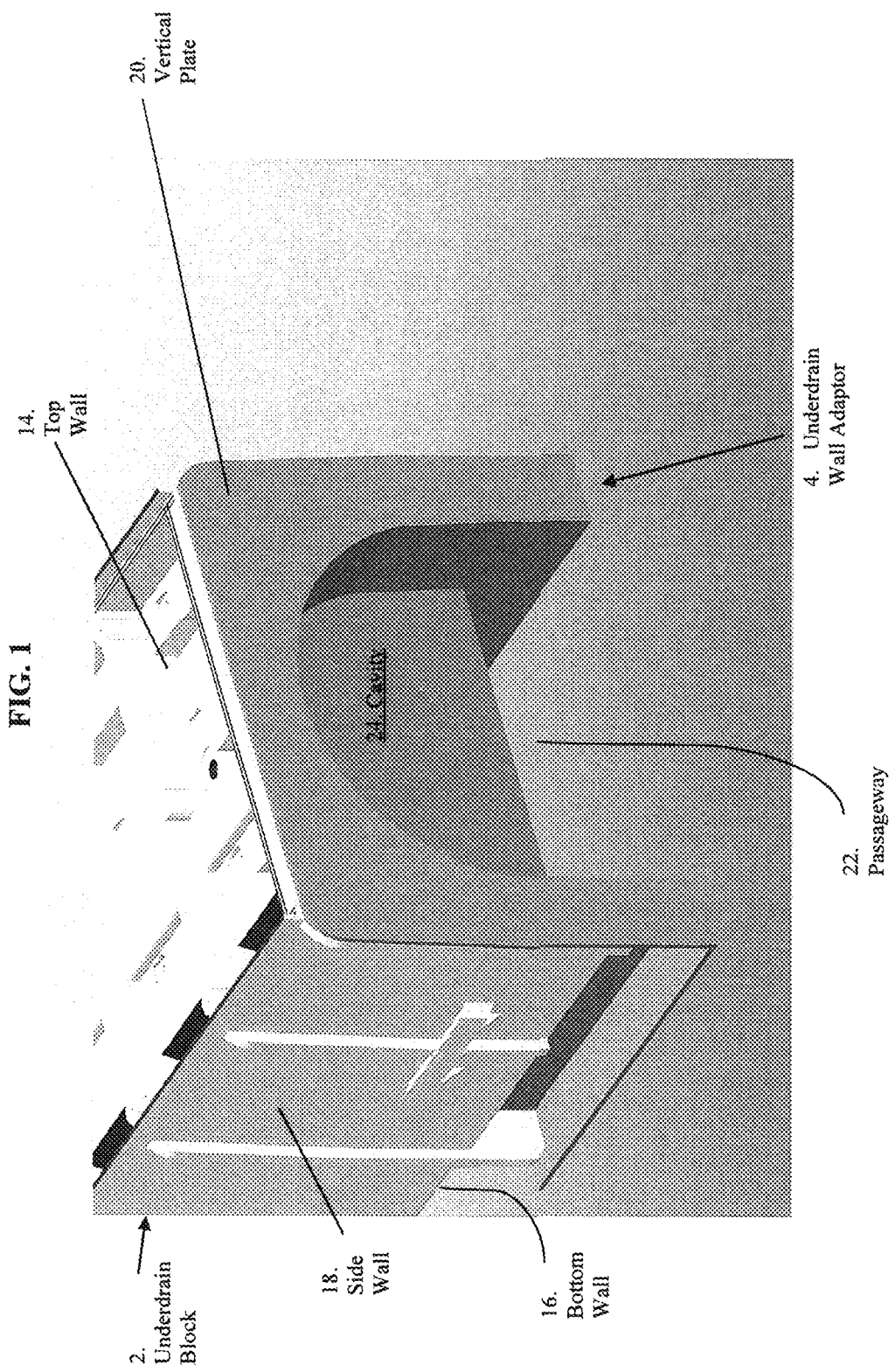
FIG. 1 shows a perspective view of an underdrain wall adaptor installed on the end portion of an underdrain block according to one aspect of the present invention.

Referring to FIG. 1, the filtration system can include an underdrain block (2) and an underdrain wall adaptor (4) as installed on an end portion (12) of the underdrain block (2).

Figure 2:
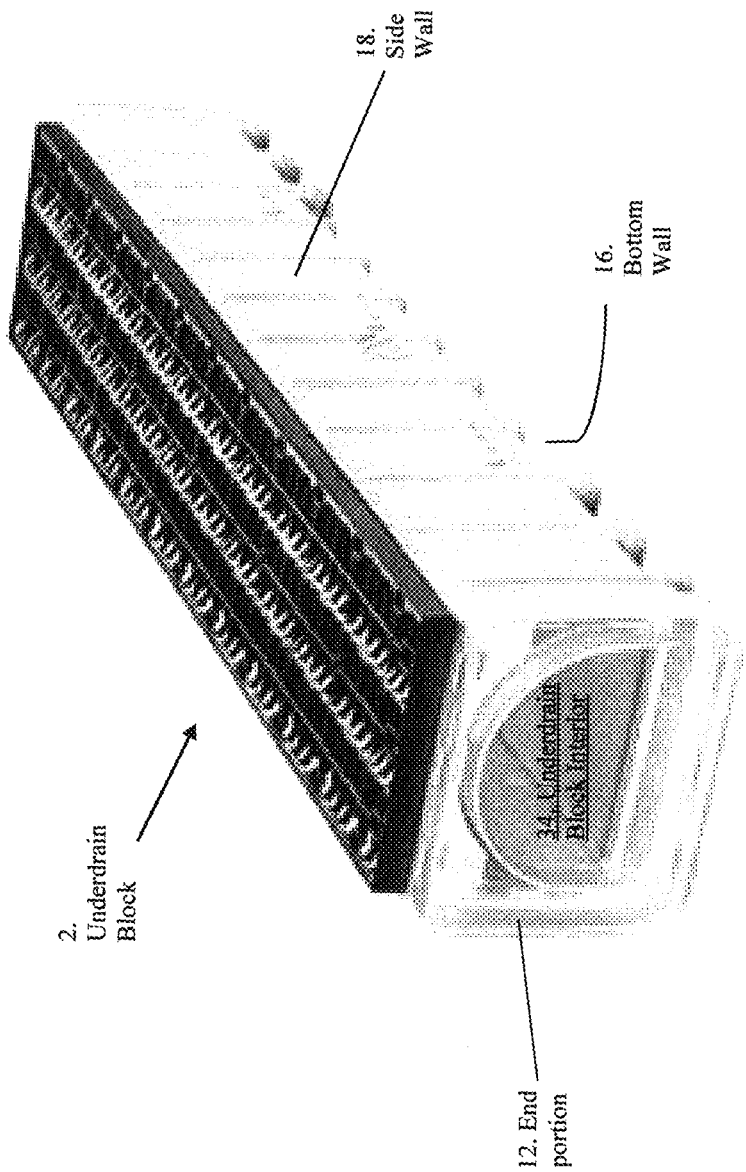
FIG. 2 shows a perspective view of an underdrain block without an underdrain wall adaptor installed according to the one aspect of the present invention.
Figure 3:
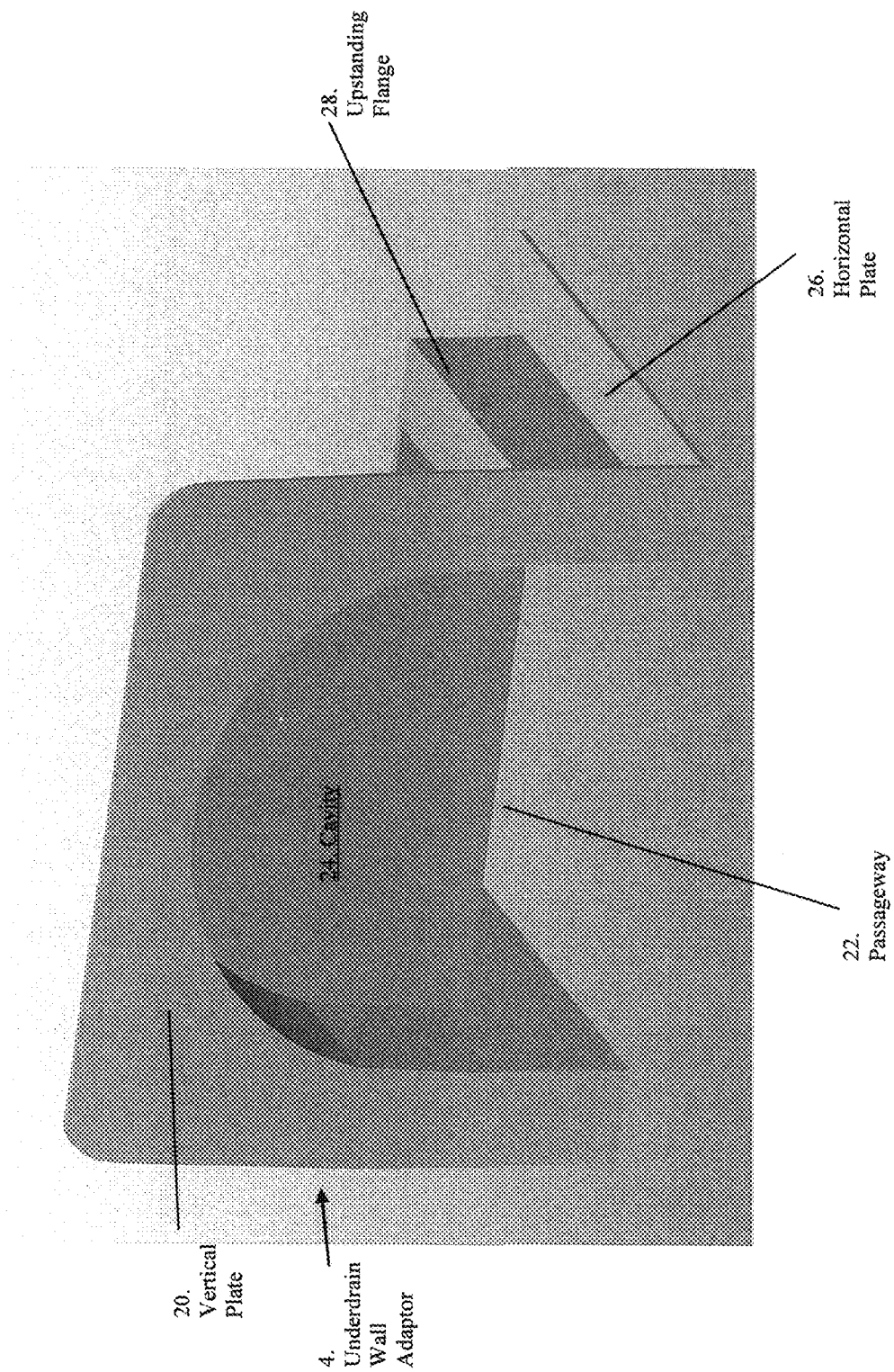
FIG. 3 shows a front perspective view an underdrain wall adaptor according to one aspect of the present invention.

As shown in FIG. 2, the underdrain block can include a top wall (14), a bottom wall (16), and two side walls (18) that connect the top wall (14) to the bottom wall (16) to form an underdrain block interior (34). The underdrain block interior (34) can be used as a channel to move filtered fluid that has passed through a filter media away from the filter. In certain aspects, underdrain blocks (2) can be square or rectangular in cross section and can have a long longitudinal axis as compared to their cross section. However, underdrain blocks (2) are not limited to such configurations. The underdrain blocks (2) can also be attached end-to-end to form long sections called laterals.

As indicated above, an underdrain wall adaptor (4) can be installed on an end portion (12) of an underdrain block (2) such that the underdrain wall adaptor (4) becomes an integral part of the underdrain block (2).

FIGS. 3-9 show the underdrain wall adaptor (4) isolated from the underdrain block (2). As shown in FIGS. 3-9, the underdrain wall adaptor can include a horizontal base (6) and a vertical end (8).

The vertical end (8) can be configured to mate with an end portion (12) of the underdrain block (2). In certain aspects, the vertical end (8) can include a vertical plate (20) and a mating extension (30). The vertical plate (20) can extend vertically from the top wall (14) to the bottom wall (16) of the underdrain block (20) and from side wall (18) to side wall (18). In the filtration system, the vertical plate (20) can attach to an end portion (12) of an underdrain block (2).

The mating extension (30) can extend from the vertical plate (20) in the direction of the underdrain block interior (34). The mating extension (30) can be configured to mate with the underdrain block interior (34) to securely attach the underdrain wall adaptor (4) to the underdrain block (2). Beneath a portion of the mating extension (30) can run a passageway (22), which can extend into the upstanding flange (28). The passageway (22) can carry fluid, air, or both fluid and air into the underdrain block interior (34) during the backwash process, or the passageway (22) can carry the filtered fluid out of the underdrain block interior (34) and away from the filter media during the filtration process.

Figure 6:
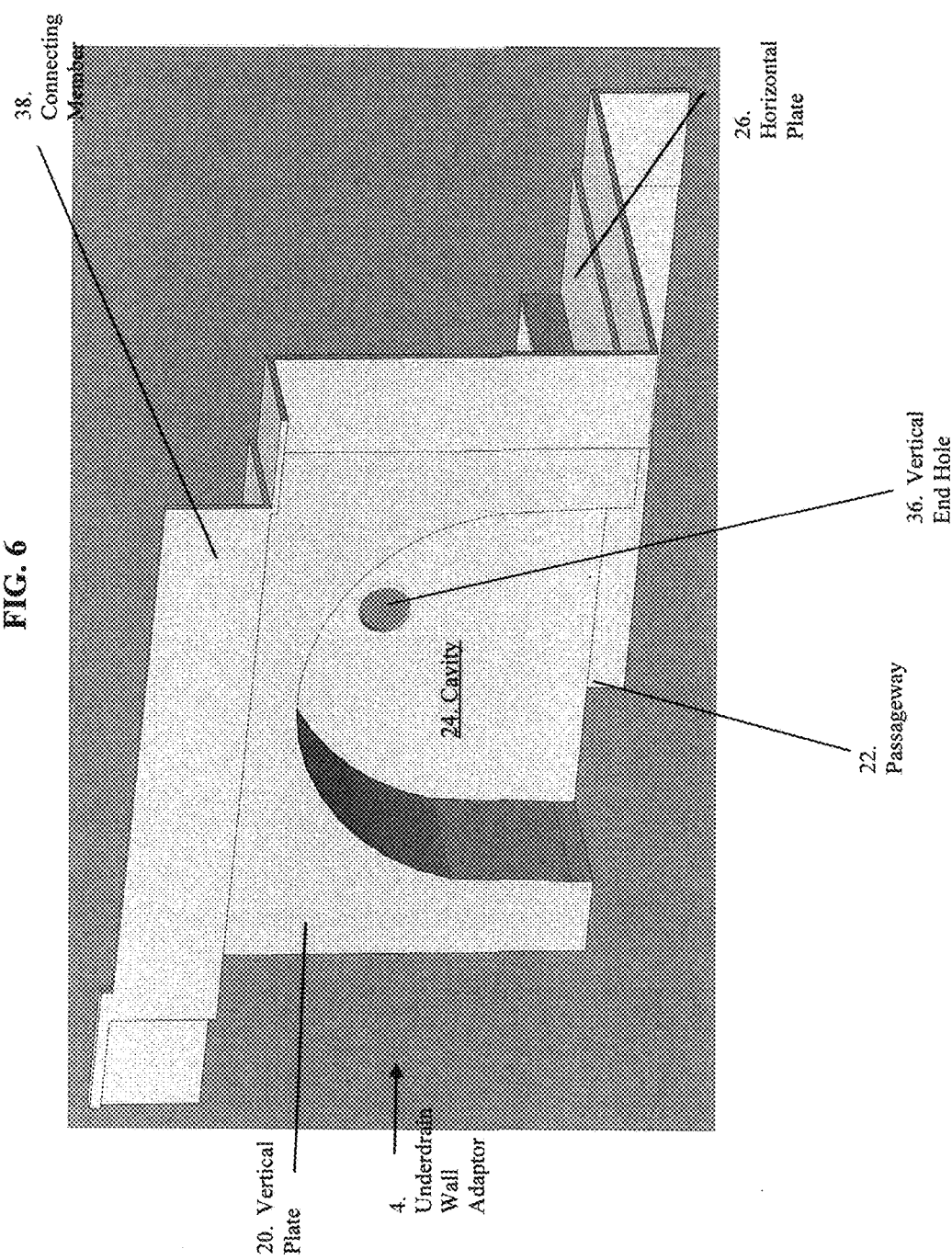
FIG. 6 shows a front perspective view of an underdrain wall adaptor according to one aspect of the invention.
Figure 7:
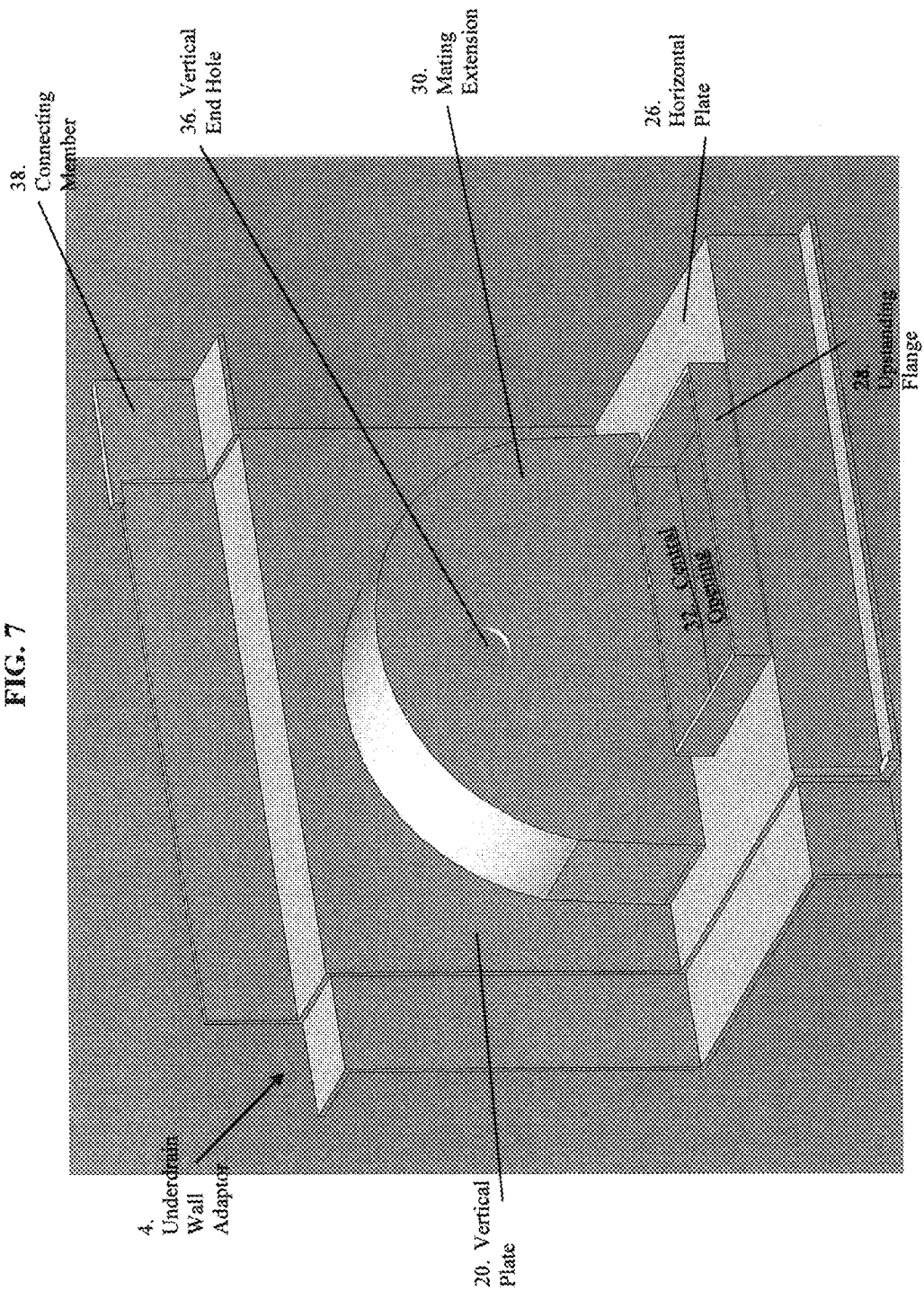
FIG. 7 shows a rear perspective view of the underdrain wall adaptor of FIG. 6.
Figure 8:
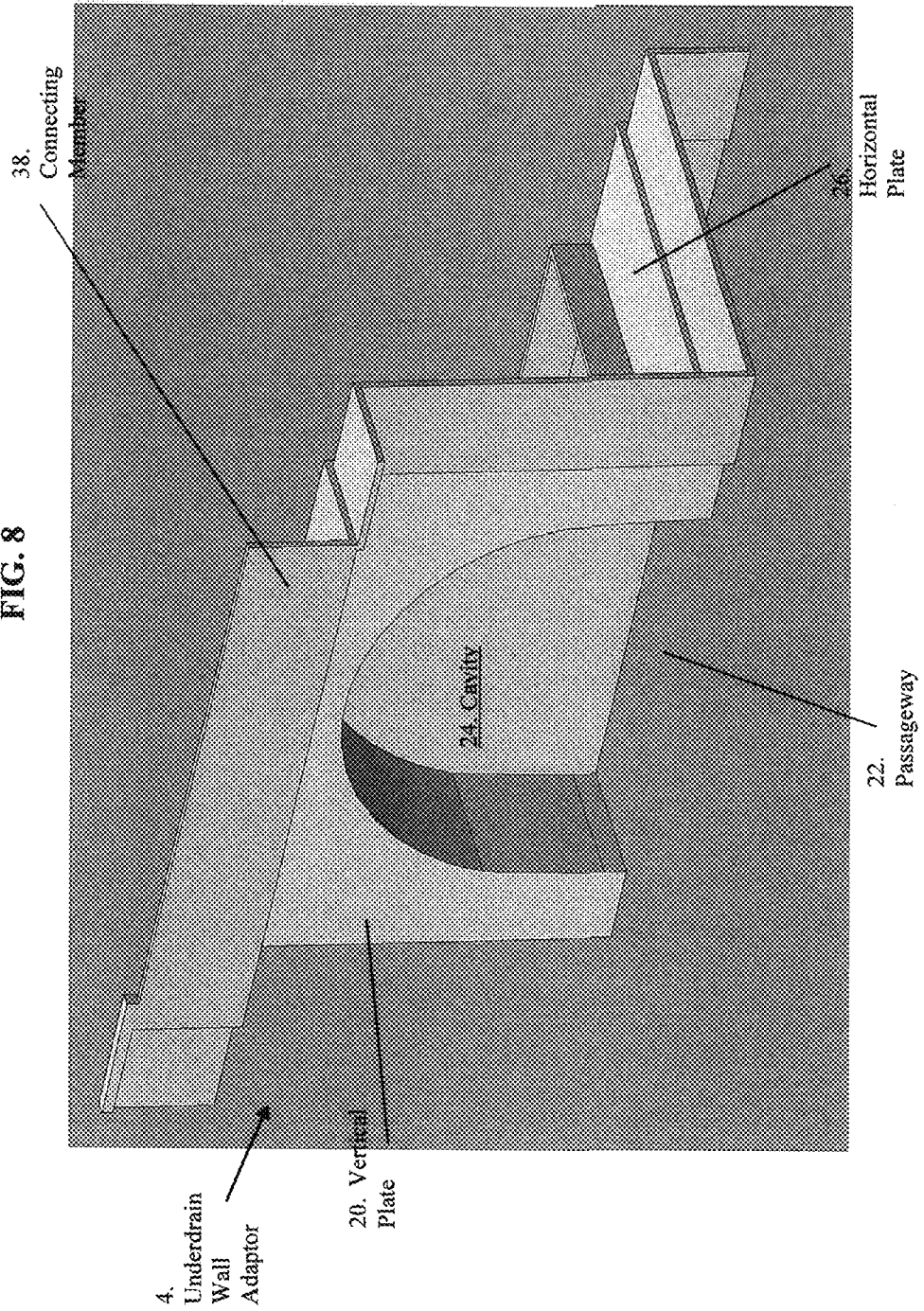
FIG. 8 shows a front perspective of an underdrain wall adaptor according to one aspect of the invention.
Figure 9:
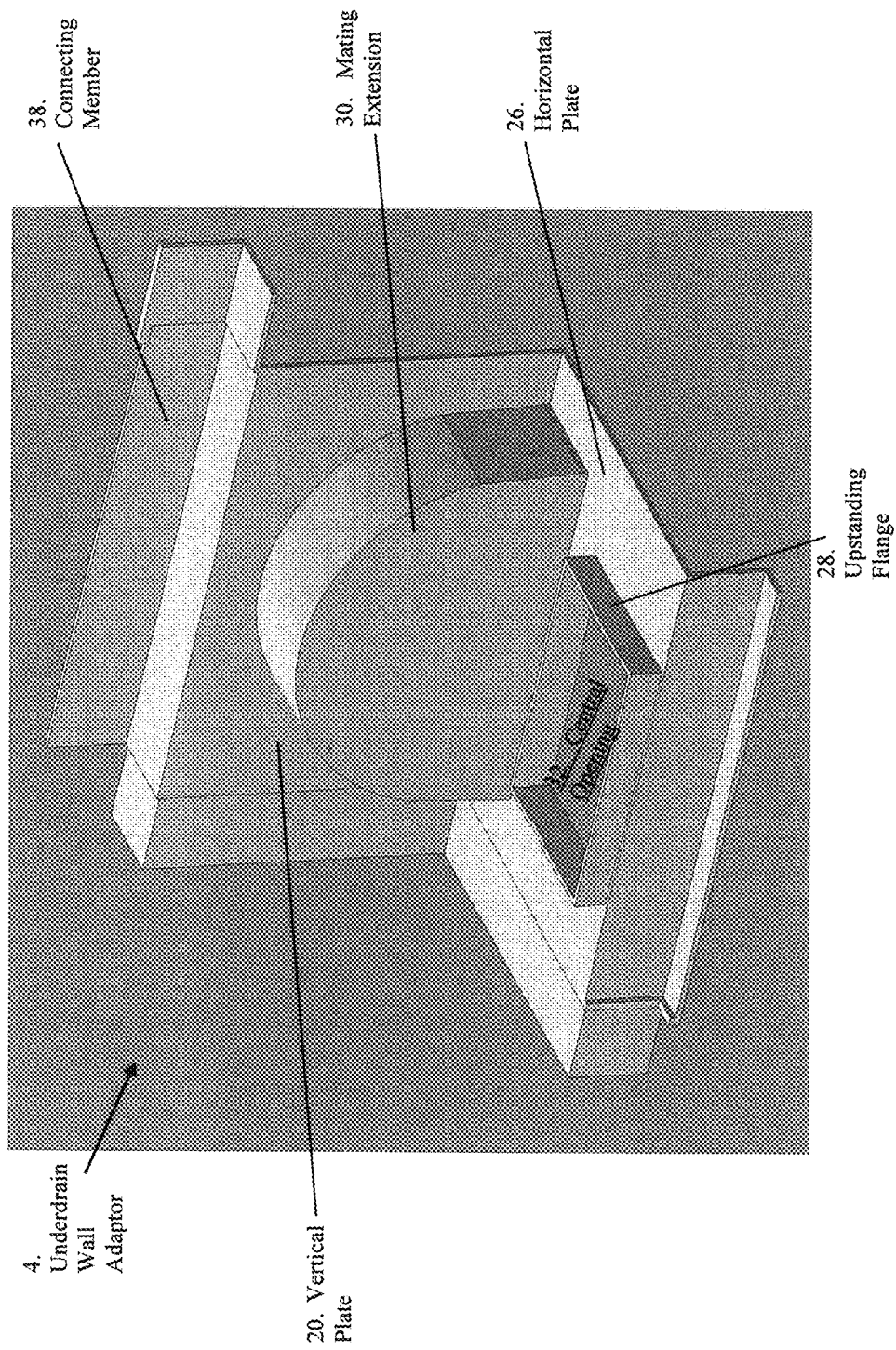
FIG. 9 shows a rear perspective view of the underdrain wall adaptor of FIG. 8.

In some aspects of the invention, the mating extension (30) can have a vertical end hole (36). An aspect of the vertical end hole (36) is shown in FIGS. 6-7. The vertical end hole can be a circular hole centered in the mating extension (30), providing an opening for passage from a cavity (24) to the underdrain block interior (34). The vertical end hole (36), however, need not be centered in the mating extension (30) in all aspects of the invention. In certain aspects of the invention, no upstanding flange (28) can be provided that allows fluid or air to enter the underdrain block interior (34). In this aspect of the invention, fluid or air can enter the underdrain block interior (34) through the vertical end hole (36). The vertical end hole (36) can vary in size to control the distribution of fluid or air.

Additionally, the vertical end (8) can include a cavity (24) that extends from the vertical plate (20) to the mating extension (30).

Additionally, the vertical end (8) can have an offset configuration or a flush configuration. The flush configuration can be seen in FIG. 3 where no member can protrude from the top portion of the vertical plate (20). The offset configuration can be seen in FIG. 6 where a perpendicular plate can extend from the top portion of the vertical plate (20) in the opposite direction of the horizontal plate (26).

Figure 4:
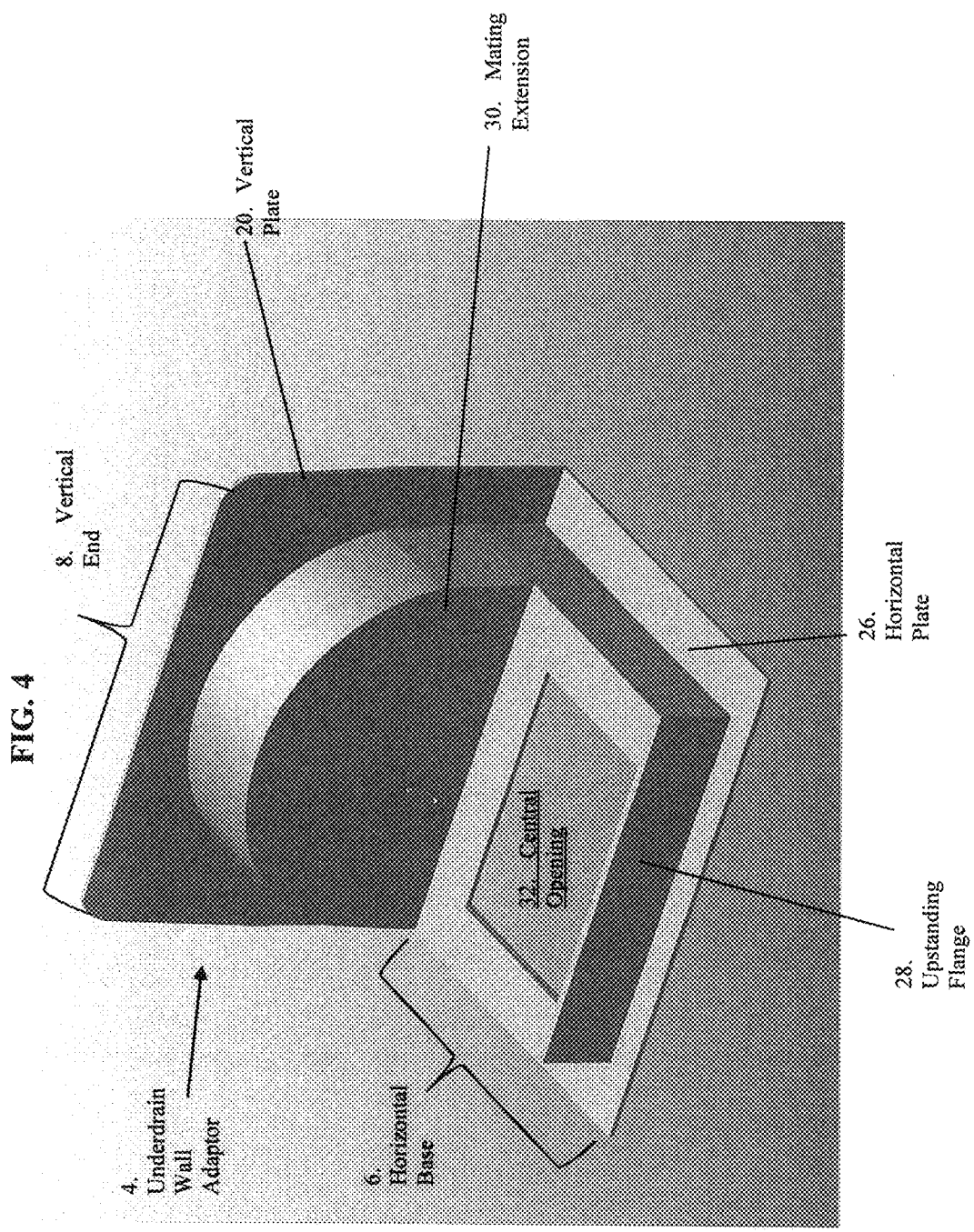
FIG. 4 shows a rear perspective view of an underdrain wall adaptor of FIG. 3.
Figure 5:
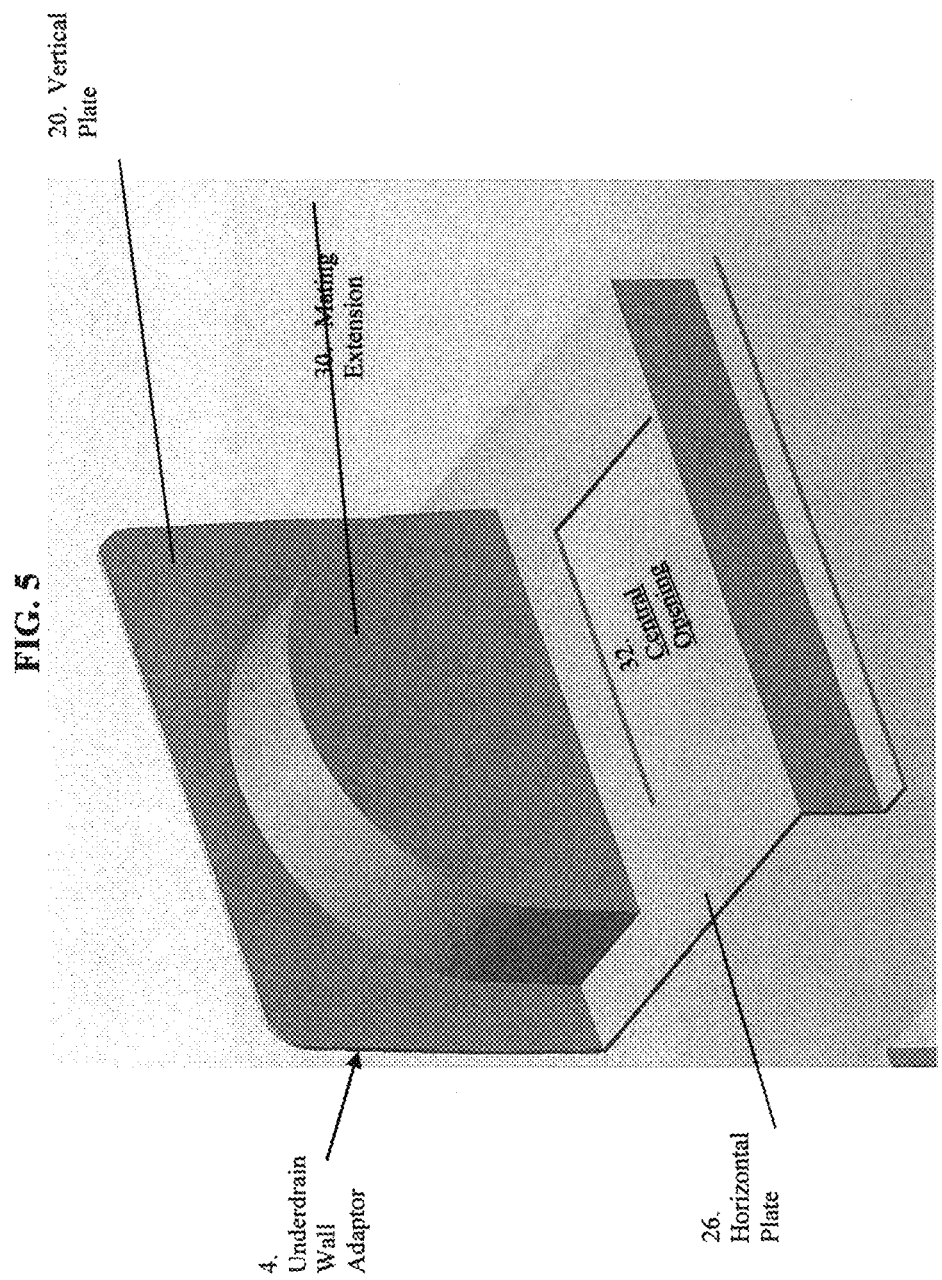
FIG. 5 shows a rear perspective view of an underdrain wall adaptor according to one aspect of the invention.

The shape of the vertical end (8) will vary based on the configuration of the underdrain block (2) to allow the vertical end (8) to mate with an end portion (12) of an underdrain block (2) and secure the underdrain wall adaptor (4) to the underdrain block (2). FIG. 4 shows one aspect of the vertical end (8), which is not meant to limit the shape of the vertical end (8), as the vertical end (8) can take the shape required to mate with an end portion (12) of an underdrain block (2). As an example, however, the vertical end (8) in FIG. 4 includes a vertical plate (20) and an arc-shaped mating extension (30). This particular aspect of the underdrain wall adaptor (4) can be installed in certain underdrain blocks (2) having an underdrain block interior (34) compatible with the arc-shape mating extension (30) of the vertical end (8) of FIG. 4. The mating extension (30) can slide into a compatibly shaped underdrain block interior (34), while the vertical plate (20) attaches to a compatibly shaped end portion (12) of an underdrain block (2). By doing so, the underdrain wall adaptor (4) is securely attached to the underdrain block (2).

The horizontal base (6), also shown in FIG. 3-FIG. 9, is the portion of the underdrain wall adaptor (4) that extends horizontally, in the direction perpendicular to the vertical end (8). The horizontal base (6) can connect to the vertical end (8) to make up the underdrain wall adaptor (4). The horizontal base (6) can include a horizontal plate (26), an upstanding flange (28), and a central opening (32).

The horizontal plate (26) can intersect and extend from the bottom portion of the vertical plate (20) in a horizontal direction. The horizontal plate (26) can fit flush with the bottom wall (16) of the underdrain block (2). In this aspect, the ribs attached to the bottom wall (16) of the underdrain block (2) can be removed to accommodate the horizontal plate (26) fitting flush with the bottom wall (16).

The upstanding flange (28) can extend up from and sit atop the horizontal plate (26). The upstanding flange (28) can be configured to receive air, fluid, or both air and fluid from the passageway (22) during the backwashing process. The upstanding flange can also be configured to receive filtered fluid from the underdrain block interior (34) and allow water to flow out through the passageway (22) and into the flume during filtration.

Further, in some aspects, the horizontal base (6) has a central opening (32). The central opening (32) can be an opening in the horizontal base (6) that, in some aspects of the invention, can extend up through the upstanding flange (28). The central opening (32) can allow fluid, air, or fluid and air, which entered the system by flowing through the passageway (22) and up through the upstanding flange (28) to enter the underdrain block interior (34). In some aspects, the central opening (32) is not necessarily centered exactly on horizontal base (6) but merely is an opening of the horizontal base (6).

Additionally, the horizontal base (6) can have an offset configuration or a flush configuration. The flush configuration can be seen in FIG. 4 where no member can protrude downward from the end portion of the horizontal plate (26) opposite the vertical end (8). The offset configuration can be seen in FIG. 5 where, a perpendicular plate can extend downward from the end portion of the horizontal plate (6) opposite the vertical end (8).

The horizontal base (6) can intersect the vertical end (8) to form the underdrain wall adaptor (4). The intersection of the horizontal base (6) and the vertical end (8) can form an angle that ranges from 80°-105°, such as from 85°-100°, such as from 87°-95°, and from 89°-91°. From the angle formed by the intersection of the horizontal base (6) and the vertical end (8), it follows that an angle can be formed from the intersection of the vertical plate (20) and the horizontal plate (26). The angle formed by the intersection of the vertical plate (20) and the horizontal plate (26) can range from 80°-105°, such as from 85°-100°, such as from 87°-95°, and from 89°-91°. In addition, from the angle formed by the intersection of the horizontal base (6) and the vertical end (8), it follows that an angle can be formed by the intersection of the mating extension (30) and the upstanding flange (28). The angle formed by the intersection of the mating extension (30) and the upstanding flange (28) can range from 80°-105°, such as from 85°-100°, such as from 87°-95°, and from 89°-91°.

For systems including more than one underdrain wall adaptor (4), a connecting member (38) can be used to attach the plurality of underdrain wall adaptors (4) side-by-side. Each underdrain wall adaptor (4) in the system can have a connecting member (38) that sits atop the vertical end (8) of the underdrain wall adaptor (4). To connect a plurality of underdrain wall adaptors (4), the connecting member (38) of the first underdrain wall adaptor (4) mates with the connecting member (38) of the second underdrain wall adaptor (4) and so on, to create a line of connected underdrain wall adaptors (4). The connecting member (38) can be adjustable to adjust the distance between neighboring underdrain wall adaptors (4). Aspects of the connecting member (38) are shown in FIG. 6-FIG. 9.

Figure 10:
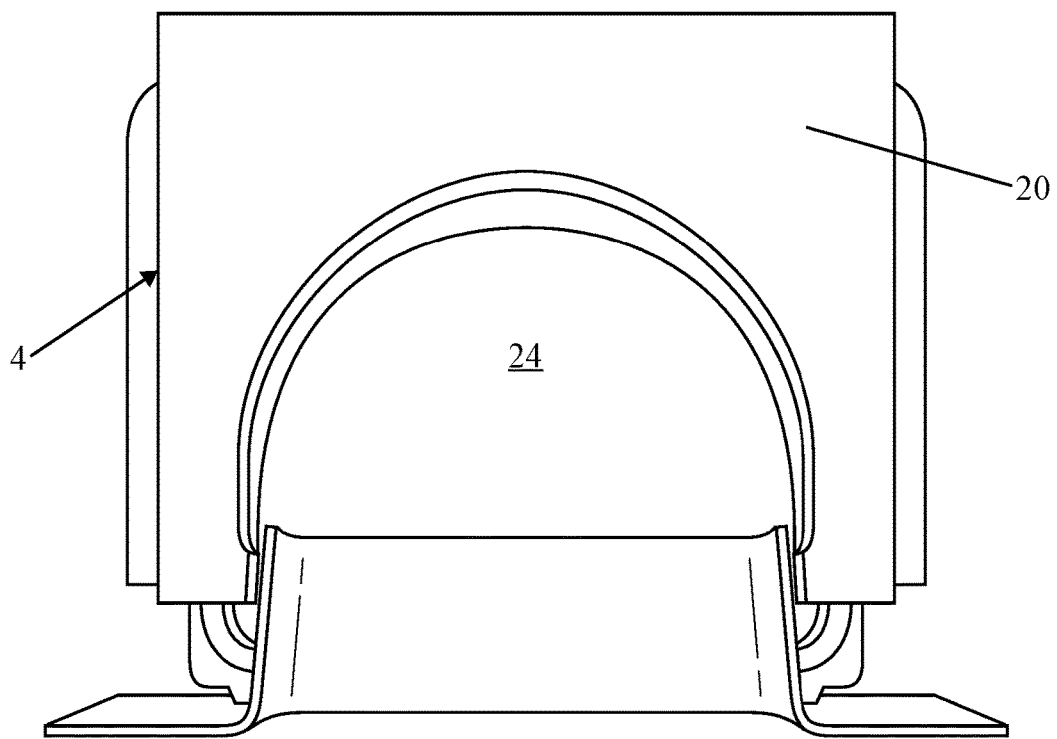
FIG. 10 shows a front view of an underdrain wall adaptor installed in an underdrain block according to one aspect of the invention.
Figure 11:
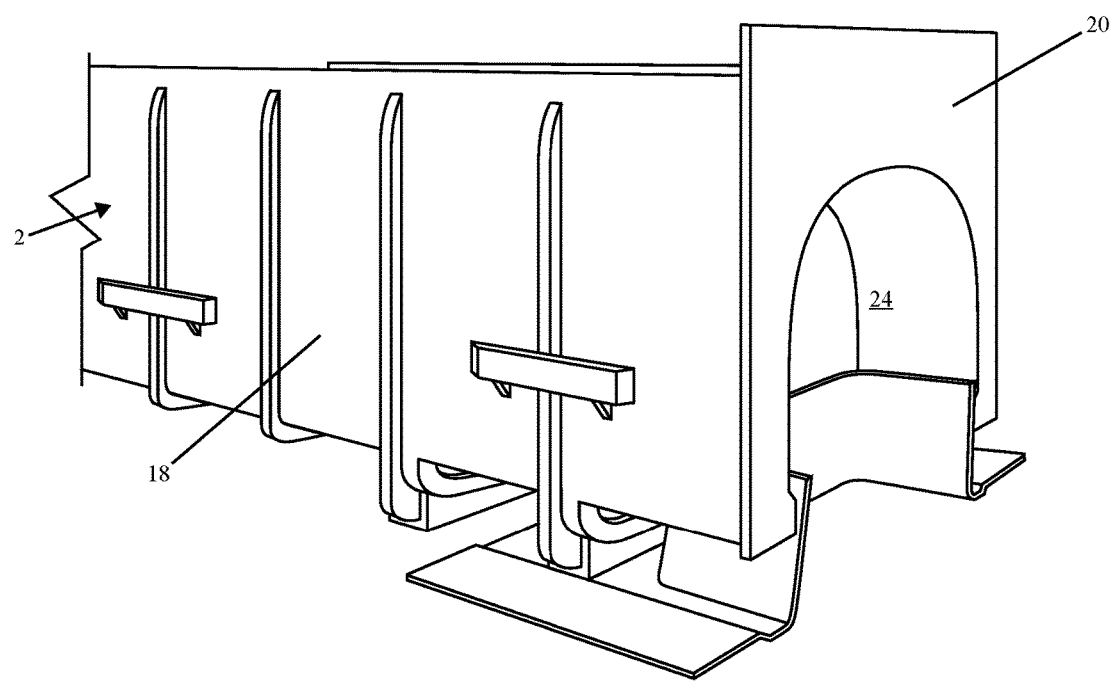
FIG. 11 shows a side perspective view of the underdrain wall adaptor installed in an underdrain block according to one aspect of the invention.

FIG. 10 and FIG. 11 show an aspect of the underdrain wall adaptor (4) installed in an underdrain block (2) from two different angles. The underdrain wall adaptor (4) can be installed in the underdrain block (2) by any means that securely attaches the underdrain wall adaptor (4) to an end portion (12) of an underdrain block (2). In one aspect, the underdrain wall adaptor (4) can be installed by mating the underdrain wall adaptor (4) with the underdrain block (2); applying a sealant or gaskets on contacting surfaces of the underdrain wall adaptor (4) and/or the filter wall (40); and applying a fillet of suitable material at a top surface intersection of the vertical end (8) and the filter wall (40). The sealant used can be Sikaflex 1a because it is NSF 61 certified for use with potable water, but Sikaflex 1a is only one example of a sealant that can be used in the invention. A grout fillet can be used in one aspect of the invention. Mating the underdrain wall adaptor (4) with the underdrain block (2) can be done by sliding the portion of the underdrain wall adaptor (4) that is configured to match an end portion (12) of an underdrain block (2) into an end portion (12) of an underdrain block (2). The filter wall (40) can be a vertical wall that is not part of the filtration system but can be part of the structure that houses the filtration system. The underdrain wall adaptor (4) can be secured and sealed to the filter wall (40).

In another aspect, the vertical end (8) includes a vertical plate (20) and a mating extension (30), and the horizontal base (6) includes a horizontal plate (26), an upstanding flange (28), and a central opening (32). For this aspect, the underdrain wall adaptor (4) can be installed in the underdrain block (2) by mating the underdrain wall adaptor (4) with the underdrain block (2); applying a sealant or gaskets on contacting surfaces of the underdrain wall adaptor (4) (including the vertical plate (20)) and/or the filter wall (40); and applying a fillet of suitable material at a top surface intersection of the vertical end and the filter wall (40). The underdrain wall adaptor (4) and the underdrain block (2) can be mated by sliding the mating extension (30) into the underdrain block interior (34).

As previously described, the underdrain wall adaptor (4) can be secured to the filter wall (40) by applying a sealant or gaskets to the underdrain wall adaptor (4) and/or the filter wall (40). In one aspect of the invention, the underdrain wall adaptor (4) can be secured to the filter wall (40) by applying sealant or gaskets to the connecting member (38) and/or the filter wall (40) and securing the connecting member (38) to the filter wall (40). The connecting member (38) can be secured flush against the filter wall (40) in this aspect of the invention. This aspect of the invention can be used to create spacing off of the filter wall (40). In another aspect of the invention, the underdrain wall adaptor (4) can be secured to the filter wall (40) by applying sealant or gaskets to the vertical plate (20) and/or the filter wall (40) and securing the vertical plate (20) to the filter wall (40). In this aspect of the invention, the underdrain wall adaptor (4) can be without a connecting member (38). The vertical plate (20) can secure flush against the filter wall (40).

Figure 12:
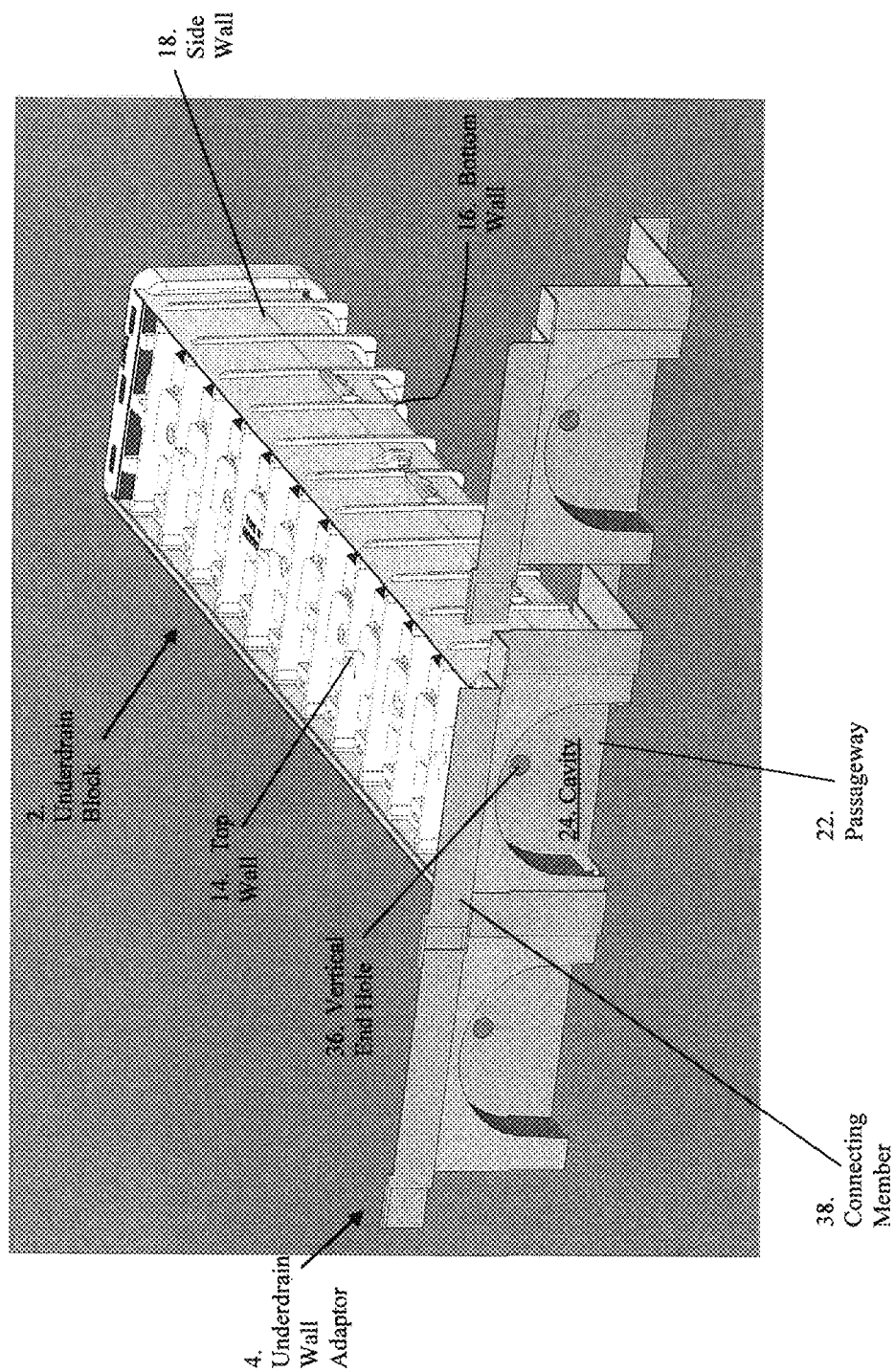
FIG. 12 shows a front perspective view of an underdrain wall adaptor installed in an underdrain block according to one aspect of the invention.
Figure 13:
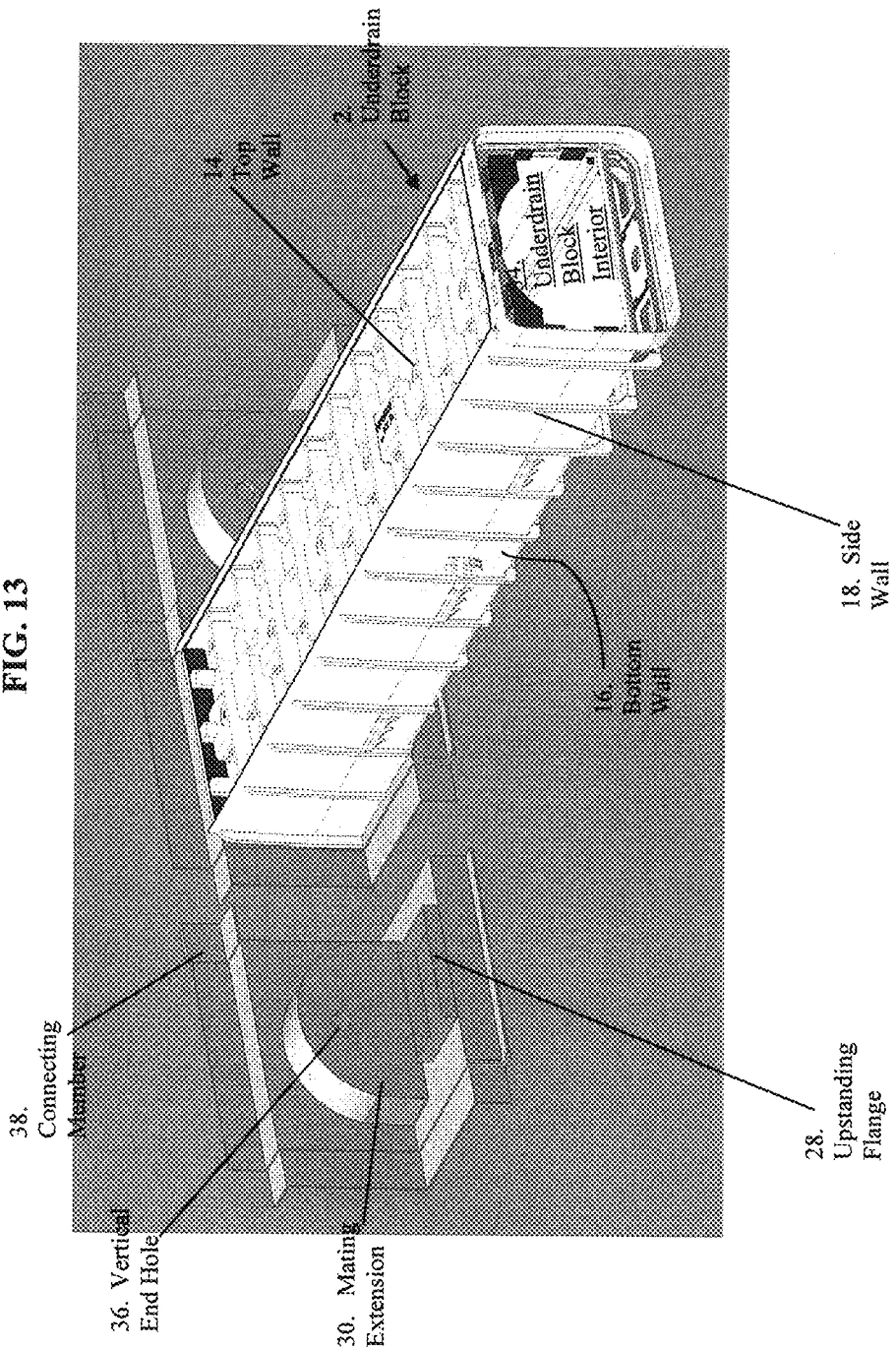
FIG. 13 shows a rear perspective view of an underdrain wall adaptor installed in an underdrain block according to one aspect of the invention.

FIGS. 12-13 show an underdrain wall adaptor (4) installed in an underdrain block (2) to make up a filtration system. A filtration system, in certain aspects, can include multiple underdrain wall adaptors (4) and multiple underdrain blocks (2). Underdrain wall adaptors (4) can be connected together, side-by-side, to form a system of underdrain wall adaptors (4). Similarly, underdrain blocks (2) can be connected together, an end portion (12) of one underdrain block (2) connected to an end portion (12) of a second underdrain block (2) to form a line of underdrain blocks (2). This line of underdrain blocks (2) can be called a lateral. A lateral can be connected to an underdrain wall adaptor (4). When there is a system of underdrain wall adaptors (4) connected by connecting members (38), multiple underdrain blocks (2) or multiple laterals, as the case may be, can be connected to the system of underdrain wall adaptors (4), with one underdrain block (2) or lateral connected to one underdrain wall adaptor (4) of the system. FIG. 12 and FIG. 13, for example, show a system of three underdrain wall adaptors (4) connected by connecting members (38). Also shown is one underdrain block (2) connected to the middle underdrain wall adaptor (4). Each of the two underdrain wall adaptors (4) on the ends of the middle underdrain wall adaptor (4) are shown in FIGS. 12-13 without an underdrain block (2) or lateral attached, but each of the vacant underdrain wall adaptors (4) could connect to an underdrain block (2) or lateral. A filtration system, therefore, could include parallel rows of laterals with an underdrain wall adaptor (4) at the end of each row of laterals.

The filtration system, like the one shown in FIGS. 12-13, can be installed to filter wall (40). The feed solution in these filtration systems is poured atop the filtering media, which sits above the underdrain block (2). The solution filters through the filtering media, leaving behind unwanted contaminants and flowing filtered water into the underdrain block interior (34). As a result, the filter must periodically be backwashed to remove collected contaminants from the filter media. Water and/or air is used for this backwashing process. When both water and air are used for backwashing the filter, there are various arrangements that can be used. The difficulty with using water and air for the backwashing practice is creating passages for air and water for proper distribution of the air and water between the flume—the chamber for distribution of water and sometimes air and for collection of filtered water—and the filtration system or in some cases to prevent air from entering the flume from the filtration system.

As further shown in FIGS. 12-13, the underdrain wall adaptor (4) can extend the entire vertical height of the underdrain block (2) (top to bottom). In other words the underdrain wall adaptor (4) can extend from the top wall (14) to the bottom wall (16) of the underdrain block (2). This can allow the underdrain block (2) to be installed in the filter tank at a lower elevation, eliminating concrete fill, maximizing the filter tank depth for filter media and improving operation efficiency. This could not be easily accomplished with previous applications. A special orifice plate was usually required as well as concrete fill to get sufficient openings for water passage and for air and water flow control.

The underdrain wall adaptor (4) can be made for passage of air and water into a single underdrain lateral. Air and water can pass into a single underdrain lateral through the underdrain wall adaptor (4) when wall openings are on nominal 12-inch centers. Air and water can also pass into a single underdrain lateral through the underdrain wall adaptor (4) with other wall openings on different centers with the underdrain wall adaptors (4) made with connecting members (38). Therefore, the underdrain wall adaptor can be suitable for wall openings with variable spacing as well.

During the backwashing process, water and air can flow up through the filter media to rid the system of contaminants. Typically, a certain dead zone exists based on the design of the system. A dead zone is a region where no backwash water or air can be discharged during the backwashing process for cleaning the filter media. In previous applications, this dead zone could extend 3-4 inches from the filter wall (40). In some aspects of the present invention, the underdrain wall adaptor (4) can be an integral part of the underdrain block (2), once installed. This can eliminate the need for other adaptors between the filter wall (40) and the underdrain block (2), which previously caused the dead zone of 3-4 inches. In certain aspects, the use of an underdrain wall adaptor (4) can reduce the dead zone during the backwashing process to less than 4 inches or 1-2 inches, from filter wall (40) instead of 3-4 inches on top of an underdrain block (2).

FIG. 14 shows a filtration system without the underdrain wall adaptor (4) of the present invention. At one end of the underdrain block (2) shown in FIG. 14, there is a stainless steel orifice plate. The stainless steel orifice plate can allow water to enter the underdrain block interior (34), while air can enter the system of FIG. 14 on an isolated end of the underdrain block (2). In the present invention, the underdrain wall adaptor (4) can replace the steel orifice plate of FIG. 14.

The underdrain wall adaptor (4) described herein can be used for controlling the air and water passage between the flume and underdrain. In one aspect, both water and air can flow through the underdrain wall adaptor (4) and into the underdrain block interior (34). In another aspect, similar in concept to the diagram of FIG. 14, only water can flow through the underdrain wall adaptor (4) and into the underdrain block interior (34). Airflow into this system can enter the underdrain block interior (34) through a separate opening on an isolated side of the underdrain block (2).

From the foregoing disclosure and detailed description of the certain preferred aspects, it is also apparent that various modifications, additions, and other alternative aspects are possible without departing from the true scope and spirit of the present invention. The aspects discussed were chosen and described to provide the best illustration of the principles of the present invention and its practical applications to thereby enable one of ordinary skill in the art to utilize the invention in various aspects and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. A filtration system comprising:
   an underdrain block comprising a top wall, a bottom wall, and two side walls connecting the top wall and bottom wall to define an underdrain block interior; and
   an underdrain wall adaptor comprising a vertical end and a horizontal base, wherein
   the vertical end is configured to mate with an end portion of the underdrain block; and
   the horizontal base extends from a bottom portion of the vertical end,
   wherein the horizontal base comprises a horizontal plate engaging the bottom wall, wherein the horizontal plate defines a central opening configured to allow fluid and/or gas to enter the underdrain block interior.

2. The filtration system according to claim 1, further comprising an upstanding flange extending from the horizontal plate.

3. The filtration system according to claim 2, wherein the vertical end comprises a vertical plate and a mating extension configured to mate with the underdrain block.

4. The filtration system according to claim 1, wherein the vertical end is connected to the horizontal base, and the angle formed by an intersection of the vertical end and the horizontal base has a range of 80°-105°.

5. The filtration system according to claim 3, wherein a cavity is formed in the vertical plate, the cavity extending from the vertical plate to the mating extension.

6. The filtration system according to claim 1, wherein the underdrain wall adaptor is sealed to the underdrain block by mating the underdrain wall adaptor with the underdrain block, applying a sealant or gaskets between contacting surfaces of the underdrain wall adaptor and/or a filter wall and by applying a suitable fillet material at a top surface intersection of the vertical end and the filter wall.

7. The filtration system according to claim 3, wherein the mating extension mates with the underdrain block interior and the vertical plate mates with an end portion of the underdrain block.

8. The filtration system according to claim 6, wherein the underdrain wall adaptor provides a dead zone during a backwashing process that extends less than or equal to four inches from the filter wall.

9. The filtration system according to claim 8, wherein the underdrain wall adaptor provides a dead zone during the backwashing process of 1-2 inches from the filter wall.

10. The filtration system according to claim 3, wherein a passageway is formed under a portion of the mating extension of the vertical end wherein the passageway extends into the upstanding flange.

11. The filtration system according to claim 3, wherein the mating extension comprises a vertical end hole.

12. An underdrain wall adaptor comprising:
   a vertical end; and
   a horizontal base, wherein the vertical end is configured to mate with an end portion of an underdrain block comprising a top wall, a bottom wall, and two side walls connecting the top wall and bottom wall to define an underdrain block interior, wherein the horizontal base extends from a bottom portion of the vertical end, and wherein the horizontal base comprises a horizontal plate engaging the bottom wall, wherein the horizontal plate defines a central opening configured to allow fluid and/or gas to enter the underdrain block interior.

13. The underdrain wall adaptor according to claim 12, further comprising an upstanding flange extending from the horizontal plate.

14. The underdrain wall adaptor according to claim 13, wherein the vertical end comprises a vertical plate and a mating extension configured to mate with the underdrain block.

15. The underdrain wall adaptor according to claim 12, wherein the vertical end is connected to the horizontal base, and the angle formed by the intersection of the vertical end and the horizontal base has a range of 80°-105°.

16. The underdrain wall adaptor according to claim 14, wherein a cavity is formed in the vertical plate, the cavity extending from the vertical plate to the mating extension.

17. The underdrain wall adaptor according to claim 14, wherein the mating extension mates with the underdrain block interior and the vertical plate mates with an end portion of the underdrain block.

18. The underdrain wall adaptor according to claim 17, wherein the underdrain wall adaptor, when mated with the underdrain block, provides a dead zone during a backwashing process that extends less than or equal to four inches from a filter wall.

19. The underdrain wall adaptor according to claim 18, wherein the underdrain wall adaptor, when mated with the underdrain block, provides a dead zone during the backwashing process of 1-2 inches from the filter wall.

20. The underdrain wall adaptor according to claim 14, wherein a passageway is formed under a portion of the mating extension of the vertical end wherein the passageway extends into the upstanding flange.

21. The underdrain wall adaptor according to claim 14, wherein the mating extension comprises a vertical end hole.

22. A method of installing an underdrain wall adaptor comprising:

mating an underdrain wall adaptor with an underdrain block comprising a top wall, a bottom wall, and two side walls connecting the top wall and bottom wall to define an underdrain block interior, wherein the underdrain wall adaptor comprises:

a vertical end configured to mate with an end portion of the underdrain block; and a horizontal base that extends from a bottom portion of the vertical end, wherein the horizontal base comprises a horizontal plate engaging the bottom wall, wherein the horizontal plate defines a central opening configured to allow fluid and/or gas to enter the underdrain block interior;

applying a sealant or gaskets on contacting surfaces of the underdrain wall adaptor and/or a filter wall; and applying a suitable fillet material at a top surface intersection of the vertical end and a filter wall.

23. The method of claim 22, wherein the vertical end comprises:

a vertical plate; and mating extension configured to mate with the underdrain block.

24. The method of claim 22, wherein the horizontal base further comprises an upstanding flange extending from the horizontal plate.

* * * * *